(12) United States Patent
Fuchs et al.

(10) Patent No.: US 11,398,964 B2
(45) Date of Patent: Jul. 26, 2022

(54) SYSTEMS AND METHODS FOR LATENCY-AWARE SOCIAL NETWORKING

(71) Applicant: Arkade, Inc., Centennial, CO (US)

(72) Inventors: Joshua Allan Fuchs, Granada Hills, CA (US); Bob Steven Berns, Centennial, CO (US); Joel Abraham Kort, Centennial, CO (US)

(73) Assignee: Arkade, Inc., Centennial, CO (US)

( * ) Notice: Subject to any disclaimer, the term of this patent is extended or adjusted under 35 U.S.C. 154(b) by 0 days.

(21) Appl. No.: 17/213,344

(22) Filed: Mar. 26, 2021

(65) Prior Publication Data

US 2022/0038358 A1    Feb. 3, 2022

Related U.S. Application Data

(63) Continuation of application No. 17/033,032, filed on Sep. 25, 2020, now Pat. No. 10,999,172.

(60) Provisional application No. 63/059,630, filed on Jul. 31, 2020.

(51) Int. Cl.

| | | |
|---|---|---|
| *H04L 47/125* | (2022.01) | |
| *H04L 41/0893* | (2022.01) | |
| *H04L 65/1059* | (2022.01) | |
| *H04L 51/046* | (2022.01) | |
| *H04L 65/403* | (2022.01) | |
| *H04L 47/283* | (2022.01) | |
| *H04L 43/0864* | (2022.01) | |
| *H04N 21/4788* | (2011.01) | |
| *H04L 65/80* | (2022.01) | |
| *H04L 65/1069* | (2022.01) | |
| *H04L 51/52* | (2022.01) | |

(52) U.S. Cl.
CPC ........ *H04L 43/0864* (2013.01); *H04L 47/125* (2013.01); *H04L 51/32* (2013.01); *H04L 65/1069* (2013.01); *H04N 21/4788* (2013.01)

(58) Field of Classification Search
CPC . H04L 43/0864; H04L 65/1069; H04L 51/32; H04L 47/125; H04N 21/4788
See application file for complete search history.

(56) References Cited

U.S. PATENT DOCUMENTS

| | | | |
|---|---|---|---|
| 8,260,873 B1 | 9/2012 | Kandekar et al. | |
| 8,712,883 B1* | 4/2014 | Yang | ............... H04L 12/1485 705/34 |
| 2009/0172157 A1* | 7/2009 | Zhang | ............... H04L 67/1059 709/224 |
| 2013/0103814 A1* | 4/2013 | Carrasco | ............. H04L 65/4092 709/223 |
| 2015/0052621 A1* | 2/2015 | Yi | ............. H04L 65/1089 726/31 |

(Continued)

*Primary Examiner* — Soe Hlaing
(74) *Attorney, Agent, or Firm* — Foley & Lardner LLP

(57) ABSTRACT

In some aspects, the disclosure is directed to methods and systems for latency-aware social networking. A media stream may be provided to a plurality of client devices, and transmission and processing latencies between each client device and one or more servers may be measured. Client devices may be organized into groups according to latency windows and, in some implementations, numbers of devices. A social networking system may provide real-time chat functionality to grouped client devices. Groups may be dynamically reorganized by latency and number as network and processing latencies change.

19 Claims, 7 Drawing Sheets

(56) References Cited

U.S. PATENT DOCUMENTS

| | | | |
|---|---|---|---|
| 2015/0209670 A1* | 7/2015 | Furumoto | A63F 13/358 463/24 |
| 2016/0134673 A1* | 5/2016 | MacInnis | H04L 65/80 709/231 |
| 2017/0091246 A1 | 3/2017 | Risvik et al. | |

* cited by examiner

SYSTEMS AND METHODS FOR LATENCY-AWARE SOCIAL NETWORKING

RELATED APPLICATIONS

This application claims the benefit of and priority as a continuation to U.S. Non-Provisional patent application Ser. No. 17/033,032, entitled "Systems and Methods for Latency-Aware Social Networking," filed Sep. 25, 2020, which claims the benefit of and priority to U.S. Provisional Patent Application No. 63/059,630, entitled "Systems and Methods for Latency-Aware Social Networking," filed Jul. 31, 2020, the entirety of each of which is incorporated by reference herein.

FIELD OF THE DISCLOSURE

This disclosure generally relates to systems and methods for communications. In particular, this disclosure relates to systems and methods for latency-aware social networking.

BACKGROUND OF THE DISCLOSURE

Social media systems allow large numbers of users to simultaneously or nearly-simultaneously view media streams and engage in live discussions. For example, web applications may provide a media stream and a live chat stream through which users watching the media stream may communicate with each other.

However, due to network and processing delays, users may not be viewing the media stream at the same time. Delays may exist such that one user is viewing the media stream seconds or even minutes ahead of another. Latency-agnostic chat systems that fail to consider these delays may result in users attempting to have a discussion being unsynchronized: one user may discuss a live event that another user has not yet seen. At best, this leads to confusion, while at worst, "spoilers" or revealing of advance information may lead to user frustration.

Furthermore, many popular media streams may have tens or hundreds of thousands or even millions of simultaneous viewers. When large numbers of these users attempt to participate in a live discussion, the resulting chat stream may be "flooded" or flow too fast to be easily read.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for latency-aware social networking; and Section B describes a network environment and computing environment which may be useful for practicing embodiments described herein.

A. Systems and Methods for Latency-Aware Social Networking

Social media systems allow large numbers of users to simultaneously or nearly-simultaneously view media streams and engage in live discussions. For example, web applications may provide a media stream and a live chat stream through which users watching the media stream may communicate with each other.

Figure 1:
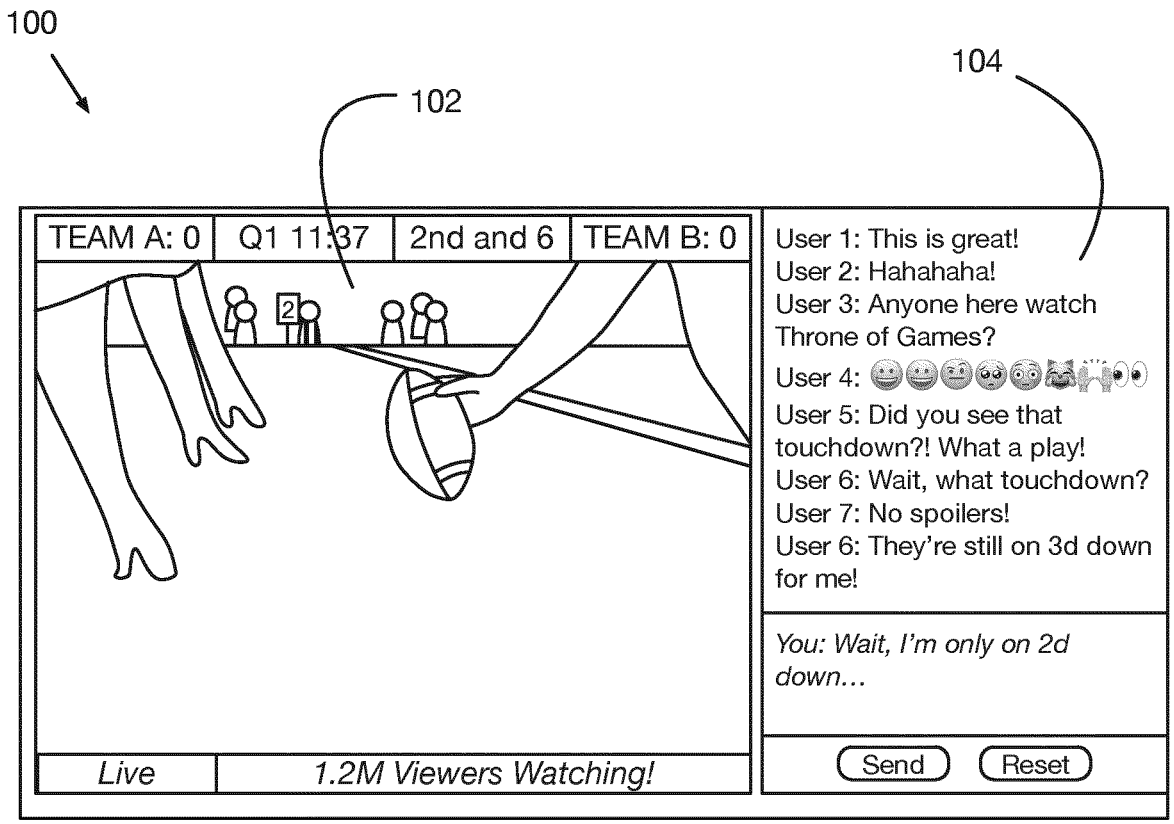
FIG. 1 is an illustration of an example of a social media web application, according to some implementations.

For example, FIG. 1 is an illustration of an example of a social media web application 100, according to some implementations. The web application 100 may be provided as a media application, as a website rendered by a browser application, or by any other suitable means. The web application 100 may be accessed by a plurality of users with a corresponding plurality of computing devices, including laptop or desktop computers, tablet computers, smartphones, smart televisions, video game consoles, or any other such devices. The web application 100 may display a media stream 102 and a chat stream 104. Media stream 102 may be displayed via an embedded media player, and may use any suitable protocol, such as HTTP live streaming (HLS) or a similar protocol. Chat stream 104 may comprise a synchronous conferencing system or online chat system provided by a server and accessed by the plurality of computing devices, and may use any suitable protocol or system, such as internet relay chat (IRC), or an embedded Javascript or Perl script within a web page accessing a database provided by a chat server.

In many implementations, due to network and processing delays, users may not be viewing the media stream at the same time. Delays may exist such that one user is viewing the media stream seconds or even minutes ahead of another. For example, a first computing device of a first user may have a slow, high latency network connection causing the first computing device to buffer 30 seconds of media before beginning playback (or may grow a buffer to that length while playing a low resolution version of the media stream before switching to a delayed high resolution version). A second computing device of a second user may have a fast, low latency connection and may buffer only a second or two before beginning playback. As a result, the first user and second user's media playback becomes desynchronized, with the second user seeing an event almost half a minute before the first user.

Latency-agnostic chat systems that fail to consider this desynchronization may lead to confusion or frustration as a user discusses a live event that another user has not yet seen. For example, a user may cheer a scoring event in a live chat while another user has not yet seen the event, spoiling the surprise and causing irritation.

Additionally, many popular media streams may have tens or hundreds of thousands or even millions of simultaneous viewers. When large numbers of these users attempt to participate in a live discussion, the resulting chat stream may be "flooded" or flow too fast to be easily read. Because users cannot participate in an actual conversation (due to replies or dialogue parts being missed as they quickly scroll off screen), some participants may post messages not intended to elicit a response (e.g. strings of emojis, spam advertisements, profanity, etc.), compounding the problem.

Accordingly, in some aspects, the systems and methods discussed herein are directed to a latency-aware social networking system. A media stream may be provided to a plurality of client devices, and transmission and processing latencies between each client device and one or more servers may be measured (including buffering delays at each client device). Client devices may be organized into groups according to latency windows or "buckets" of devices experiencing similar total delays, and the social networking system may provide real-time chat functionality to grouped client devices. New buckets and chat groups or chat rooms may be dynamically instantiated as necessary, e.g. when the latency spread between devices is above a threshold. In some implementations, groups may be limited to a predetermined size or number of devices, to prevent flooding of chat messages. Groups may be dynamically reorganized by latency and number as network and processing latencies change, and as devices join or leave the network. Thus, these systems and methods provide near-synchronization of media streams and chat streams for devices within each group, avoiding the desynchronization issues discussed above.

Figure 2A:
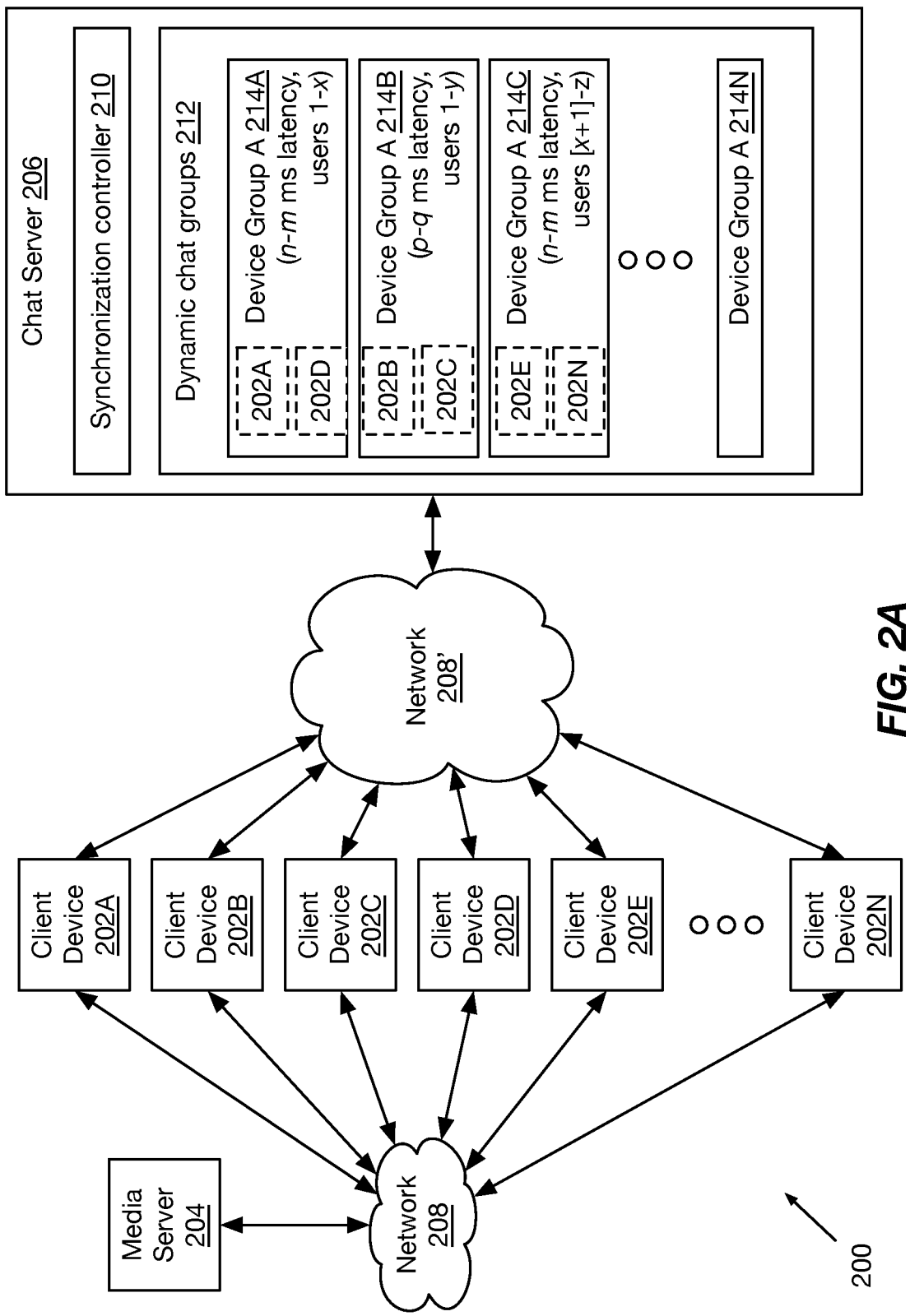
FIG. 2A is a block diagram of a system for latency-aware social networking, according to some implementations.

FIG. 2A is a block diagram of a system 200 for latency-aware social networking, according to some implementations. A plurality of client devices 202A-202N (referred to generally as client device(s) 202, user devices, clients, or by similar terms) may receive a media stream from a media server 204 via a network 208. Client devices 202 may comprise any type and form of computing device, including smart televisions, smartphones, tablet computers, laptop computers, desktop computers, etc. As discussed above, the media stream may be provided by the media server via any sort of suitable protocol, such as HLS or similar streaming protocols. Media server 204 may comprise any type and form of computing device or devices, including streaming appliances, workstations, rackmount servers, blade servers, virtual servers executed by one or more physical computing devices (e.g. deployed as a cloud or content delivery network), etc. Network 208 may comprise a local area network (LAN), wide area network (WAN) such as the Internet, cellular networks, satellite networks, broadband networks, peer-to-peer networks, or any combination of these or other networks, and may include additional devices not illustrated (e.g. routers, switches, gateways, access points, firewalls, load balancers, etc.).

Client devices 202 may connect via a network 208' (which may be any type of network as discussed above, and may be network 208 in some implementations) to a chat server 206. Chat server 206 may comprise any type and form of computing device or devices, including streaming appliances, workstations, rackmount servers, blade servers, virtual servers executed by one or more physical computing devices (e.g. deployed as a cloud or content delivery network), etc., and may be the same server as media server 204. Chat server 206 may provide a chat stream to each client device 202, such as an IRC chat stream or access to a chat log or database via a script executed by a web browser or other application of a client device.

As discussed above, each client device 202 may have a given latency a of communications between media server 204 and the client device 202 (e.g. due to geographical distance, network congestion or bandwidth, etc.). Each client device 202 may also have a processing delay b, which may be a total delay of both a buffer size (e.g. 5 second buffer, 15 second buffer, 30 second buffer, etc.) as well as time to receive, decode, and render a media stream (e.g. time for depacketization, decryption, decompression, decoding, and rendering, which may be anywhere from milliseconds to seconds, depending on the computer resources). Each client device 202 may also have a latency c between the client device and the chat server 206 (e.g. half of a round trip time of 2c), as well as processing delays d of both the chat server to provide chat data and the client device to receive and render chat data (which may be referred to as $d_{server}$ and $d_{client}$ in some implementations). Thus, given a media event at time $t_{media}$, a client device may render the event to a user at time $t_{media}+a+b$, and given a request from the client for additional chat data at time $t_{chat}$, the client device may render chat data at time $t_{chat}+2c+d$. If a user takes time r to view an event in a rendered media stream and provide a chat comment, a second user at a second computing device may receive their comment at time $t_{media}+a_{client\ 1}+b_{client\ 1}+r+c_{client\ 1}+d_{server}+c_{client\ 2}\pm d_{client\ 2}$, which may be significantly different than $t_{media}+a_{client\ 2}+b_{client\ 2}$.

To provide approximate chat synchronization between different client devices, a synchronization controller 210 of a chat server 206, which may comprise an application, service, server, daemon, or any other executable logic, may measure delays and latency of each client and sort clients into corresponding delay groups 212 (sometimes referred to as latency groups, chat groups, chat buckets, social networking groups, social networking service groups, social networking sub-services, or by similar terms). For example, a client device may transmit a request to join a chat stream for a corresponding media stream, and may provide a presentation timestamp or program clock reference of the media stream that is being presented when the request is sent. Due to media server-client latency and client-side buffering, this reference time will be behind real time by a+b. In some implementations, the client device may also provide an identification of a client buffer size, allowing disambiguation of a and b. The synchronization controller may also measure a round trip time to the client (e.g. as part of a request-response cycle or handshaking or authentication procedure), providing a measure of c and an approximation of $d_{client}$ (while the processing time to respond to a simple request from the server may be lower than the processing time needed to render a chat stream, the difference may be on the order of micro- or milliseconds and may be negligible relative to the other delays). The synchronization controller may determine processing delay $d_{server}$ as a difference of a receipt timestamp of a packet requesting an update to a chat stream or log and a transmission timestamp of a corresponding response packet.

Figure 2B:
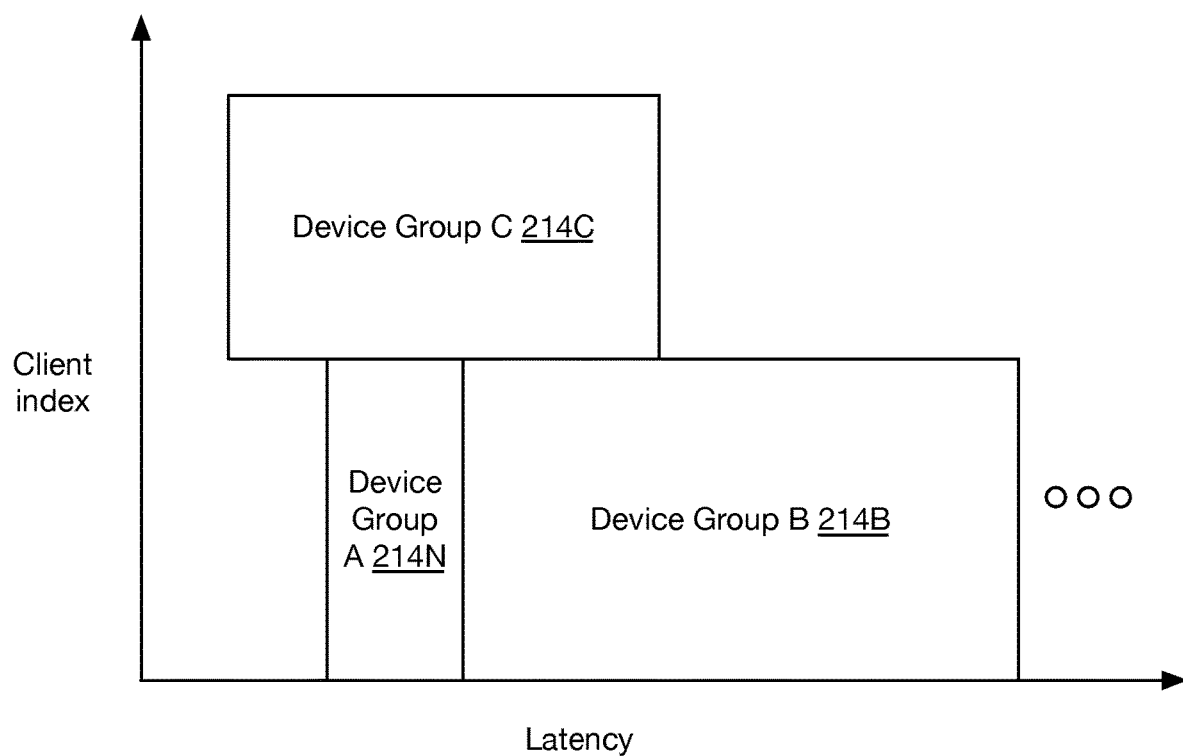
FIG. 2B is a graph illustrating groupings of client devices in a latency-aware social networking system, according to some implementations.

Once a total delay or in some implementations, a media presentation delay, of a client has been determined, the client may be assigned to a dynamic chat group having a corresponding latency window or range (e.g. groups 214A-214N). Each group may comprise an identification of a set of client devices that are subscribed to that chat group (shown in dashed boxes), and may correspond to a separate chat room or log instantiated for that group of client devices. For example, a first chat group 214A may comprise client devices with presentation delays from 5 seconds to 10 seconds, while a second chat group 214B may comprise client devices with presentation delays from 10 seconds to 20 seconds. Referring briefly to FIG. 2B, illustrated is a graph of groupings of client devices in a latency-aware social networking system, according to some implementations. Different device groups 214A-214N may have different latency or delay ranges (which may be referred to as a bucket width or window or by similar terms). This may be done to ensure an approximately equal number of devices in each group (which may be referred to as a bucket depth or by similar terms), in some implementations. For example, very few devices may have a delay as long as 2 minutes, and it may be desirable in some implementations to provide a more active chat group such devices, so a corresponding delay range may be from 30 seconds to 2 minutes; many more devices may have a delay on the order of 15 seconds, so a corresponding delay range for their group may be 15-16 seconds. In other implementations, the number of devices allowed in any particular group may be different. The client index may be related to the number of devices within a group for a given latency window; in the example illustrated, a device group A214N may be limited to a number of devices x (e.g. 50 devices) to prevent flooding. Additional devices that would otherwise be placed in that device group by latency may then be added to a different or newly instantiated device group (e.g. device group 3, with devices x+1 through y (e.g. another 50 devices, from device #51 to #100). In many implementations as shown, groups may have different widths in order to ensure a predetermined depth (or may have a shallower depth or fewer number of devices, particularly when a chat group is first instantiated or growing). Groups may also be dynamically reshuffled in some implementations. For example, given 25 devices with an approximately 20 second delay and 25 devices with an approximately 25 second delay and a group size cap at 50 devices, these devices may be grouped together in a single device group. If another device with a 20 second delay joins, the group may be split into two groups (one with 26 devices with approximately 20 second delays, or a window from, for example, 17.5 seconds to 22.5 seconds; and one with 25 devices with approximately 25 second delays or 22.6 seconds to 27.5 seconds). If the another device subsequently leaves, in some implementations, the two groups may be merged. This ensures that groups remain under a predetermined size while keeping close media synchronization.

Figure 3:
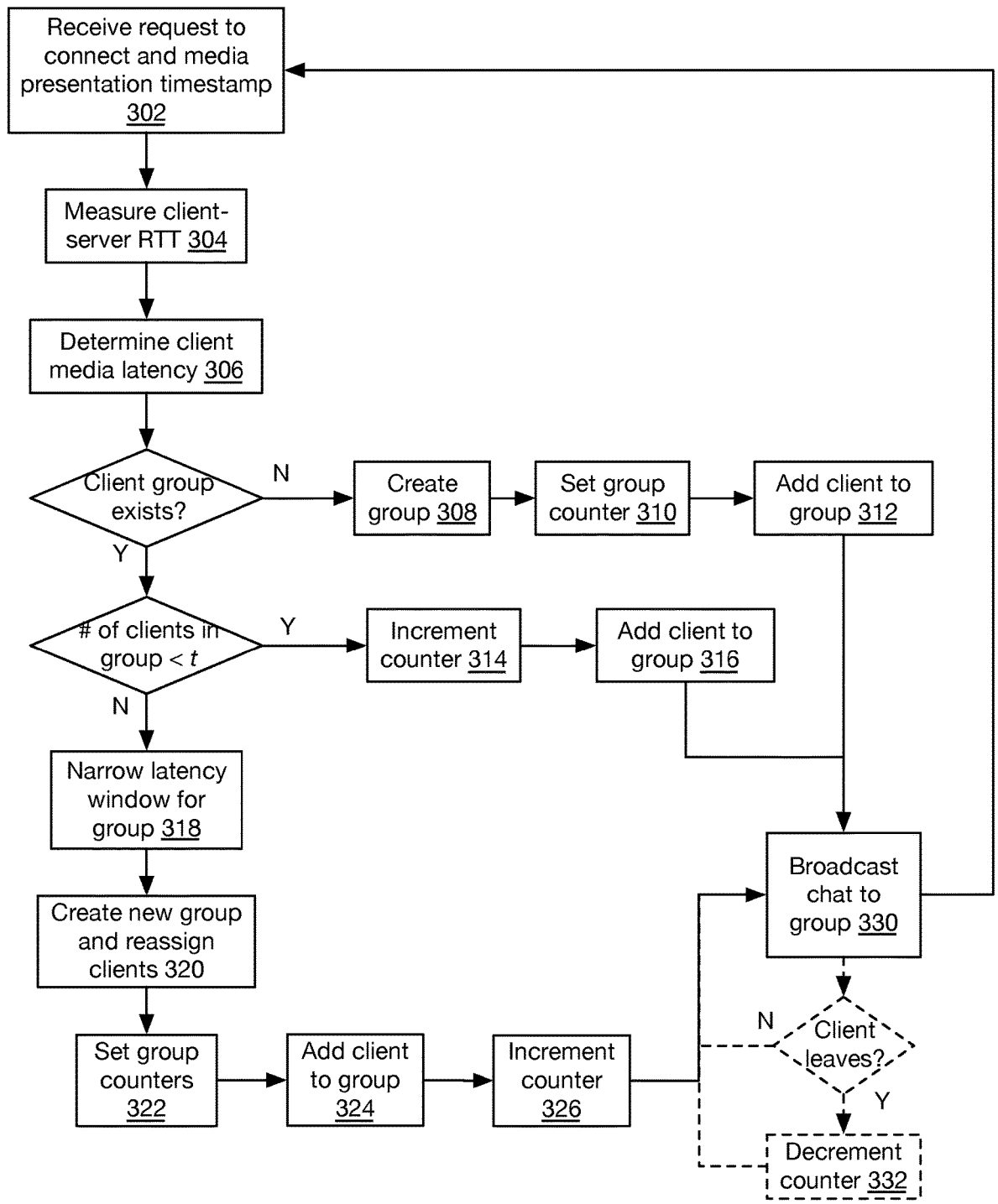
FIG. 3 is a flow chart of a method for latency-aware social networking, according to some implementations.

FIG. 3 is a flow chart of a method for latency-aware social networking, according to some implementations. At step 302, a chat server may receive a request from a client to connect or subscribe to chat, and the request may include a media presentation timestamp or program clock reference (or the timestamp or clock reference may be received in response to a subsequent request sent to the client). At step 304, the chat server may determine a round trip time to the client (e.g. via a request-response or handshaking procedure or other such method). At step 306, the chat server may determine the media latency or total latency of the client device.

If a chat group does not exist with a window containing the determined latency, then at step 308, a new group may be instantiated (or existing groups shuffled and a new group instantiated as discussed above). A counter for the group may be reset at step 310 (e.g. to 1, or another number based on the number of devices added during reshuffling) and at step 312, the client may be added to the group. The chat may then be broadcast to group devices at step 330 using the chat protocols discussed above.

If the group exists and does not have a threshold t number of devices already, then at step 314, a counter for the group may be incremented, and the client added to the group at step 316.

If the group exists and already has a threshold t number of devices, then at step 318 in some implementations, a latency window for the group may be narrowed or reduced and at step 320 a new group may be created for the remaining portion of the latency window. Clients may be assigned to each group based on their latency. At step 322, group counters may be reset for each group based on the assignments. At step 324, the client may be added to a corresponding group and the counter may be incremented at step 326.

During broadcasting, if a client leaves a group, in some implementations at step 332, a counter for the group may be decremented. The method may be repeated for each new client while broadcasting and group management continues.

Accordingly, the systems and methods discussed herein provide for latency-aware social networking. A media stream may be provided to a plurality of client devices, and transmission and processing latencies between each client device and one or more servers may be measured. Client devices may be organized into groups according to latency windows and, in some implementations, numbers of devices. A social networking system may provide real-time chat functionality to grouped client devices. Groups may be dynamically reorganized by latency and number as network and processing latencies change.

Furthermore, while primarily discussed in terms of live content, the above-discussed systems and methods can also be applied to streaming content that is viewed simultaneously or nearly simultaneously by large numbers of users. For example, popular television shows or newly released movies may be watched by millions of users worldwide, and, particularly on the day they are released or within a few days or weeks, are watched by thousands or tens of thousands of users simultaneously or nearly simultaneously. That is, while each individual user watches the program "on demand", due to the large number of users, many may be watching the program at the same time. Such users may be grouped into dynamic chat rooms as discussed above, allowing for social chat for non-live content.

Additionally, while the above-discussed systems and methods discuss grouping synchronized devices into buckets in order of arrival, in many implementations, devices with similar latencies (e.g. classified within the same latency window) may be grouped into buckets based on further policies or parameters, including user account preferences. For example, and particularly in implementations in which a large number of dynamic groups are created for the same or similar latency windows (e.g. 20 rooms with a 50-device cap to accommodate 1000 devices, all with latencies within a second or two), devices may be shuffled into groups based on preferences or characteristics associated with a corresponding user account, such as whether the user has indicated a preference for certain movies or television shows, political preferences, demographic characteristics, geographic characteristics, or any other such preferences or characteristics. Grouping similar devices and users in this manner may provide more topics for discussion in the dynamically generated chat rooms, while still maintaining approximate synchronization of the chat relative to the programming.

In a first aspect, the present disclosure is directed to a method for latency-aware social networking. The method includes receiving, by a host computing device, a request from a first client device to connect to a social network service associated with a media stream, the request comprising a presentation timestamp of the media stream. The method also includes determining, by the host computing device, a latency associated with the first client device. The method also includes identifying, by the host computing device, a first client group of a plurality of client groups, each client group of the plurality of client groups associated with a latency window. The method also includes adding, by the host computing device, the first client device to the first client group. The method also includes establishing, by the host computing device, a connection between the first client device and a social network sub-service corresponding to the first client group.

In some implementations, the method includes determining a difference between the presentation timestamp of the media stream and a present time. In a further implementation, the method includes measuring a round trip time (RTT) between the host computing device and the first client device. In a still further implementation, the method includes determining the latency associated with the first client device by adding the difference between the presentation timestamp of the media stream and the present time, and the measured RTT between the host computing device and the first client device.

In some implementations, the method includes identifying the first client group, responsive to the latency associated with the first client device being within the latency window associated with the first client group. In some implementations, the method includes determining that a number of client devices currently associated with the first client group is below a threshold. In some implementations, the method includes identifying a second client group; determining that a number of client devices currently associated with the second client group is equal to or above a threshold; and generating the first client group, responsive to the determination that the number of client devices currently associated with the second client group is equal to or above the threshold. In a further implementation, the method includes moving at least one client device currently associated with the second client group to the first client group. In another further implementation, the latency associated with the first client device is within the latency window associated with the second client group; and the method includes narrowing the latency window associated with the second client group to exclude the latency associated with the first client device, responsive to the determination that the number of client devices currently associated with the second client group is equal to or above the threshold. In some implementations, the method includes broadcasting chat messages of client devices of the first client group to each other client device of the first client group.

In another aspect, the present disclosure is directed to a system for latency-aware social networking. The system includes a host computing device comprising a processor and a network interface in communication with a first client device. The processor is configured for: receiving a request from a first client device to connect to a social network service associated with a media stream, the request comprising a presentation timestamp of the media stream; determining a latency associated with the first client device; identifying a first client group of a plurality of client groups, each client group of the plurality of client groups associated with a latency window; adding the first client device to the first client group; and establishing a connection between the first client device and a social network sub-service corresponding to the first client group.

In some implementations, the processor is further configured for determining a difference between the presentation timestamp of the media stream and a present time. In a further implementation, the processor is further configured for measuring a round trip time (RTT) between the host computing device and the first client device. In a still further implementation, the processor is further configured for adding the difference between the presentation timestamp of the media stream and the present time, and the measured RTT between the host computing device and the first client device.

In some implementations, the processor is further configured for identifying the first client group, responsive to the latency associated with the first client device being within the latency window associated with the first client group. In some implementations, the processor is further configured for determining that a number of client devices currently associated with the first client group is below a threshold. In some implementations, the processor is further configured for: identifying a second client group; determining that a number of client devices currently associated with the second client group is equal to or above a threshold; and generating the first client group, responsive to the determination that the number of client devices currently associated with the second client group is equal to or above the threshold. In a further implementations, the processor is further configured for moving at least one client device currently associated with the second client group to the first client group. In another further implementation, the latency associated with the first client device is within the latency window associated with the second client group; and the processor is further configured for narrowing the latency window associated with the second client group to exclude the latency associated with the first client device, responsive to the determination that the number of client devices currently associated with the second client group is equal to or above the threshold. In some implementations, the processor is further configured for broadcasting chat messages of client devices of the first client group to each other client device of the first client group.

B. Computing and Network Environment

Figure 4A:
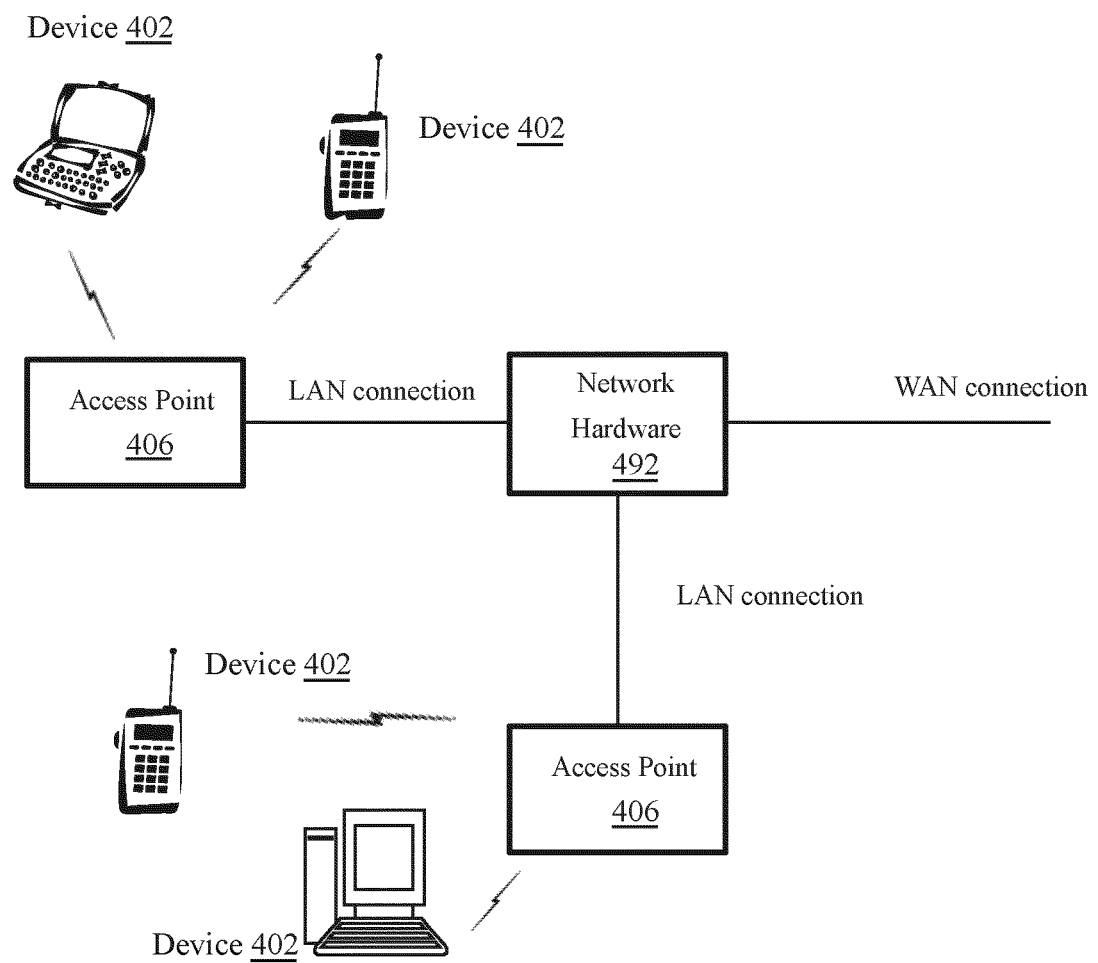
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a stand-alone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
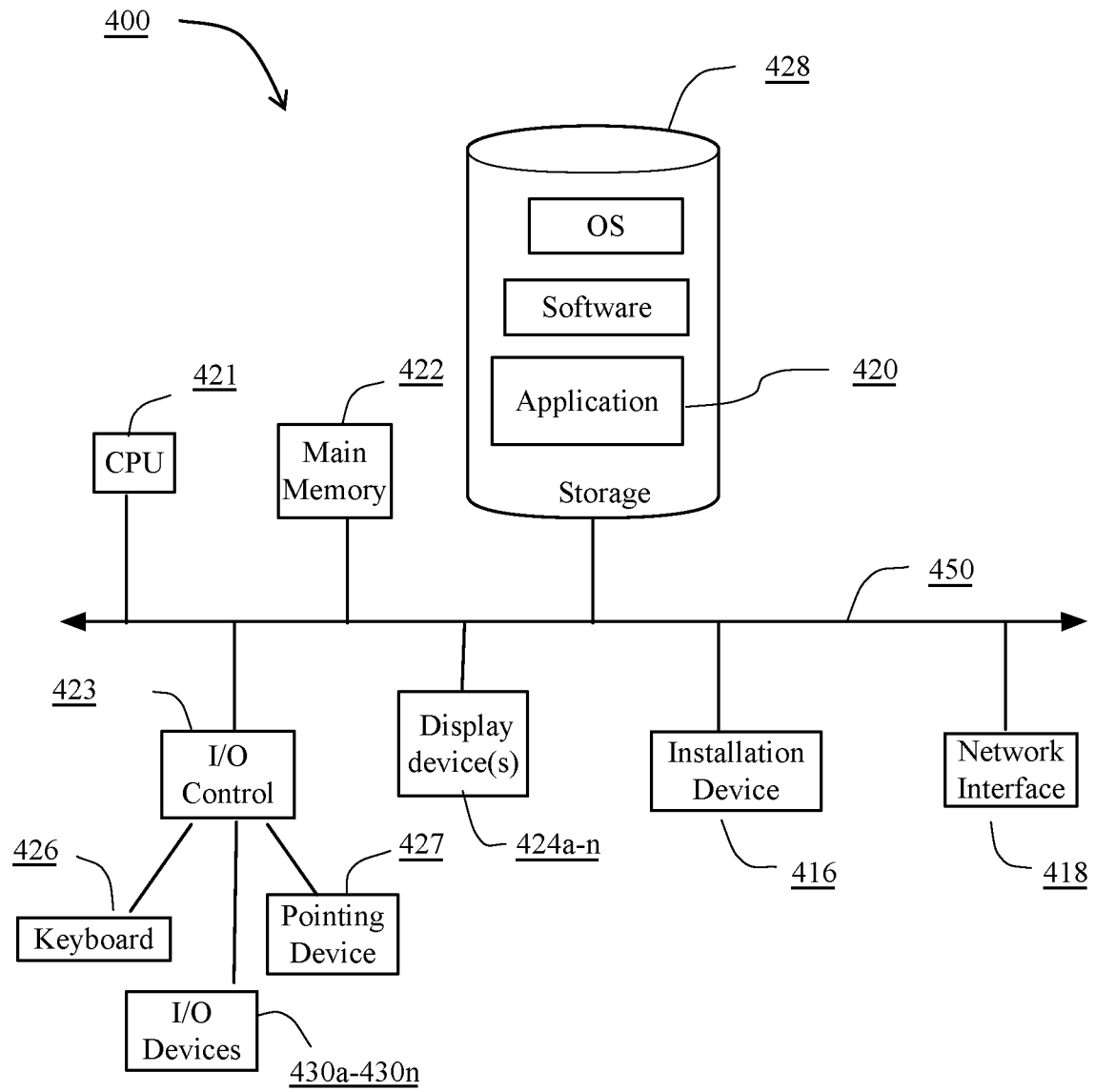
FIGS. 4B and 4C are block diagrams depicting embodiments of computing devices useful in connection with the methods and systems described herein.
Figure 4C:
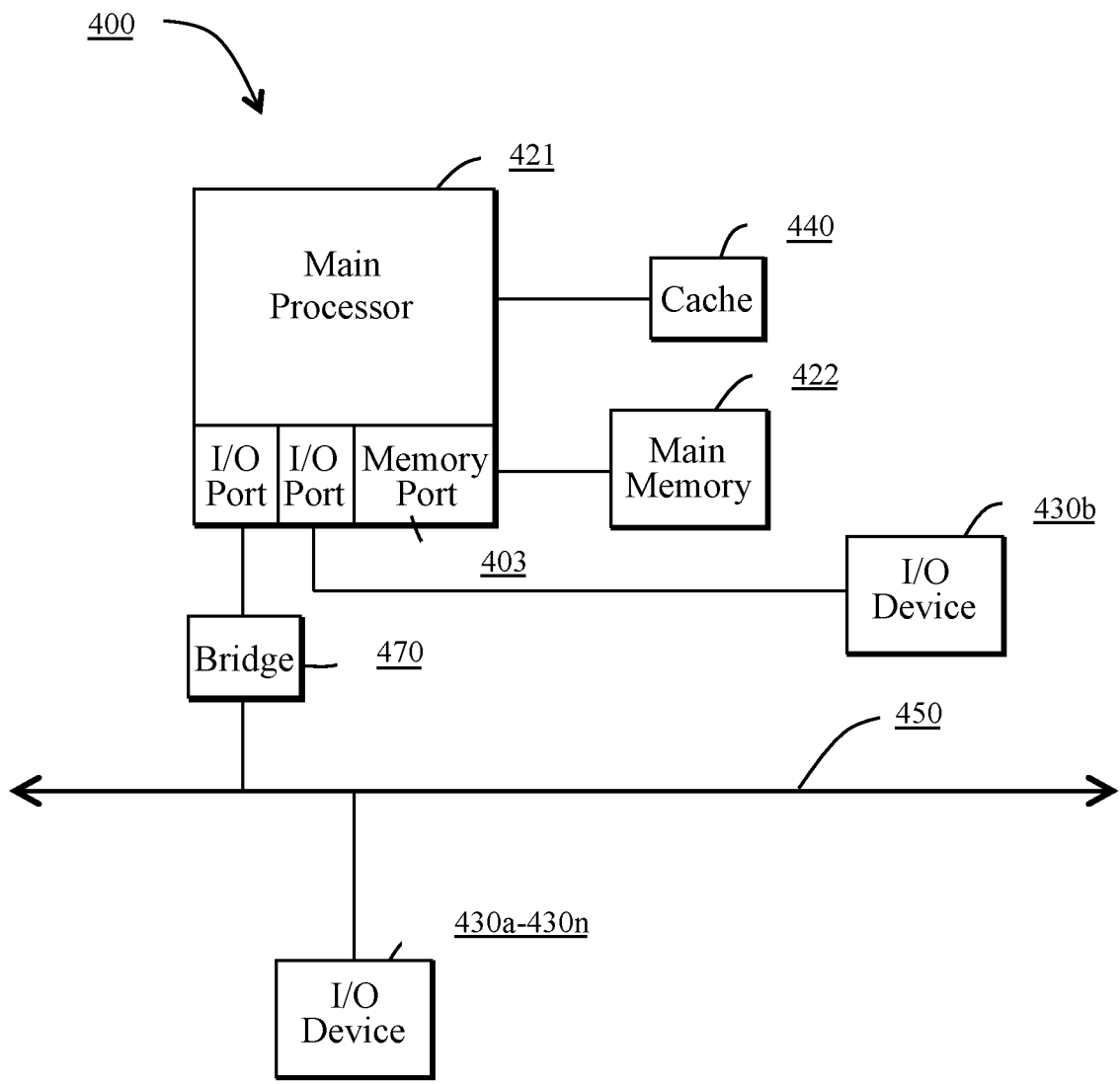

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein. Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A method for latency-aware social networking, comprising:
   receiving, by a host computing device, a request from a first client device to connect to a social network service associated with a live media stream, the request comprising a presentation timestamp extracted by the first client device from the live media stream;
   determining, by the host computing device, a latency associated with the first client device;
   identifying, by the host computing device, a first client group of a plurality of client groups, each client group of the plurality of client groups associated with a latency window;
   adding, by the host computing device, the first client device to the first client group; and
   establishing, by the host computing device, a connection between the first client device and a social network sub-service corresponding to the first client group,
      wherein the plurality of client groups comprises a second client group, and
      wherein each client device associated with the first client group presents content from a first moving time window of the live media stream while each client device associated with the second client group presents content from a second moving time window of the live media stream, the first moving time window not identical to the second moving time window.

2. The method of claim 1, wherein determining the latency associated with the first client device further comprises determining a difference between the presentation timestamp of the live media stream and a present time.

3. The method of claim 2, wherein determining the latency associated with the first client device further comprises measuring a round trip time (RTT) between the host computing device and the first client device.

4. The method of claim 3, wherein determining the latency associated with the first client device further comprises adding the difference between the presentation timestamp of the live media stream and the present time, and the measured RTT between the host computing device and the first client device.

5. The method of claim 1, wherein identifying the first client group further comprises identifying the first client group, responsive to the latency associated with the first client device being within the latency window associated with the first client group.

6. The method of claim 1, wherein identifying the first client group further comprises determining that a number of client devices currently associated with the first client group is below a threshold.

7. The method of claim 1, wherein identifying the first client group further comprises:
   identifying a second client group;
   determining that a number of client devices currently associated with the second client group is equal to or above a threshold; and
   generating the first client group, responsive to the determination that the number of client devices currently associated with the second client group is equal to or above the threshold.

8. The method of claim 7, further comprising moving at least one client device currently associated with the second client group to the first client group.

9. The method of claim 1, wherein establishing the connection between the first client device and the social network sub-service corresponding to the first client group further comprises broadcasting chat messages of client devices of the first client group to each other client device of the first client group.

10. A system for latency-aware social networking, comprising:
    a host computing device comprising a processor and a network interface in communication with a first client device;
    wherein the processor is configured for:

receiving a request from a first client device to connect to a social network service associated with a live media stream, the request comprising a presentation timestamp extracted by the first client device from the live media stream;

determining a latency associated with the first client device;

identifying a first client group of a plurality of client groups, each client group of the plurality of client groups associated with a latency window;

adding the first client device to the first client group; and establishing a connection between the first client device and a social network sub-service corresponding to the first client group, wherein the plurality of client groups comprises a second client group, and wherein each client device associated with the first client group presents content from a first moving time window of the live media stream while each client device associated with the second client group presents content from a second moving time window of the live media stream, the first moving time window not identical to the second moving time window.

11. The system of claim 10, wherein the processor is further configured for determining a difference between the presentation timestamp of the live media stream and a present time.

12. The system of claim 11, wherein the processor is further configured for measuring a round trip time (RTT) between the host computing device and the first client device.

13. The system of claim 12, wherein the processor is further configured for adding the difference between the presentation timestamp of the live media stream and the present time, and the measured RTT between the host computing device and the first client device.

14. The system of claim 10, wherein the processor is further configured for identifying the first client group, responsive to the latency associated with the first client device being within the latency window associated with the first client group.

15. The system of claim 10, wherein the processor is further configured for determining that a number of client devices currently associated with the first client group is below a threshold.

16. The system of claim 10, wherein the processor is further configured for:

identifying a second client group;

determining that a number of client devices currently associated with the second client group is equal to or above a threshold; and generating the first client group, responsive to the determination that the number of client devices currently associated with the second client group is equal to or above the threshold.

17. The system of claim 16, wherein the processor is further configured for moving at least one client device currently associated with the second client group to the first client group.

18. The system of claim 10, wherein the processor is further configured for broadcasting chat messages of client devices of the first client group to each other client device of the first client group.

19. A non-transitory computer-readable medium for latency-aware social networking, the non-transitory computer-readable medium having instructions embodied thereon, the instructions executable by one or more processors to:

receive a request from a first client device to connect to a social network service associated with a live media stream, the request comprising a presentation timestamp extracted by the first client device from the live media stream;

determine a latency associated with the first client device;

identify a first client group of a plurality of client groups, each client group of the plurality of client groups associated with a latency window;

add the first client device to the first client group; and establish a connection between the first client device and a social network sub-service corresponding to the first client group, wherein the plurality of client groups comprises a second client group, and wherein each client device associated with the first client group presents content from a first moving time window of the live media stream while each client device associated with the second client group presents content from a second moving time window of the live media stream, the first moving time window not identical to the second moving time window.

* * * * *